United States Patent [19]

Green et al.

[11] 4,411,800

[45] Oct. 25, 1983

[54] HIGH TEMPERATURE STABLE FLUID LOSS CONTROL SYSTEM

[75] Inventors: Peter C. Green, Ellicott City; Jacob Block, Rockville, both of Md.

[73] Assignee: W. R. Grace & Co., New York, N.Y.

[21] Appl. No.: 257,091

[22] Filed: Apr. 24, 1981

[51] Int. Cl.$^3$ ............................................... C09K 7/02
[52] U.S. Cl. ............................... 252/8.5 A; 252/8.5 C
[58] Field of Search ............ 252/8.5 A, 8.5 B, 8.5 C, 252/8.55 R; 525/61

[56] References Cited

U.S. PATENT DOCUMENTS

| | | | |
|---|---|---|---|
| 2,879,268 | 3/1959 | Jullander | 536/87 |
| 3,272,749 | 9/1966 | Martin | 252/8.5 |
| 3,475,334 | 10/1969 | Boudreaux | 252/8.55 |
| 3,900,406 | 8/1975 | Clampitt et al. | 252/8.5 X |
| 3,909,421 | 9/1975 | Gaddis | 252/8.55 |
| 4,059,533 | 11/1977 | Watson et al. | 252/8.5 |
| 4,234,433 | 11/1980 | Rhudy et al. | 252/8.55 |

FOREIGN PATENT DOCUMENTS 356408  9/1931  United Kingdom ................. 525/61

*Primary Examiner*—Herbert B. Guynn
*Attorney, Agent, or Firm*—Howard J. Troffkin

[57] ABSTRACT

The present invention is directed to a high temperature stable composition capable of imparting a combination of pseudoplasticity and fluid loss control properties to aqueous systems. The composition is a combination of:
  (a) a solid, particulate silicate or alumino-silicate material;
  (b) a chemical compound capable of converting to a higher oxidation state under alkaline conditions; and
  (c) a reaction product of a polymeric substance selected from polyvinyl alcohol or hydroxyalkyl cellulose reacted with at least 1 percent of stoichiometry of a cross-linking agent selected from an epihalohydrin or an aldehyde containing or generating agent;

wherein the amount of component (a) is at least 75 wt. percent of component (c) and component (b) is at least 25 wt. percent of component (c).

The invention is further directed to improved drilling fluids containing said composition and to the process of drilling bore holes using said improved fluid.

7 Claims, No Drawings

HIGH TEMPERATURE STABLE FLUID LOSS CONTROL SYSTEM

BACKGROUND OF THE INVENTION

The present invention relates to a composition which is capable of imparting a high degree of fluid loss controlling properties to aqueous systems under elevated temperature conditions. More particularly, the present invention relates to the formation of an improved water-based drilling fluid containing the subject composition and to an improved method of drilling bore holes into subterranean formations wherein high temperature conditions are encountered.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and well wall. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high shear conditions which are present in the environs of the drill bit while, at the same time, being capable of having and maintaining sufficient viscosity to be capable of efficiently carrying the bit cuttings to the surface and maintaining in suspension, any other solid components of the drilling fluid.

One of the primary requisites of a satisfactory drilling fluid is its ability to inhibit the amount of fluid, normally water, which is lost into the porous strata through which the bore hole traverses. The loss of fluid causes the formation and build-up of a cake deposit which, after a period of time, can cause sticking of the drill pipe and stoppage of the drilling operation. The drilling fluid must, therefore, be of a nature which permits minimum loss into the porous strata. Agents which impart such property are conventionally termed "water loss controllers" or "fluid loss controllers".

The drilling fluid components must also be stable and functional after subjection to elevated temperature conditions. In addition to the heat generated by the frictional forces of the drill bit, it is well known that the temperatures encountered in the bore hole are substantially above that found at the earth's surface. The deeper the bore hole is, the higher the temperature encountered. Drilling to greater depths has become common in today's guest for discovering new reserves. A general rule of thumb indicates that for each 10° F. to 20° F. increase in temperature stability one can use the same fluid to drill an additional 1000 ft. It is, therefore, desired to produce a composition capable of exhibiting stability and desired functionality at the elevated temperatures commonly encountered in deep drilling operations.

The viscosity of a drilling fluid has been relied upon as a mode of aiding in fluid loss control with little success especially when drilling into and through porous substrates. Various agents have been added to enhance the fluid loss properties of the mud. For example, U.S. Pat. No. 3,032,498 describes a cynaoethylated starch as a water loss controller to be used in combination with a clay-based mud. U.S. Pat. No. 3,988,246 describes an esterified or etherified starch as a water loss controlling agent which is compatible with a xanthan gum based drilling mud. Other agents as well as the starches mentioned above which have been employed in clay-free muds to control fluid loss are generally found to be unstable to the temperature conditions encountered in deep well drilling.

Bentonite clays which have sodium as the major exchangeable ion, such as Wyoming bentonite, have been used to impart fluid loss controlling properties to drilling fluids. These bentonites must be used in large dosages to approach practical fluid loss properties and usually impart fluid loss control which is still less than desired by the industry. Bentonite clays which have calcium or magnesium as the major exchangeable ion are not capable of imparting fluid loss properties.

The various agents which have been used to aid in controlling fluid loss have, generally been found to be unstable at elevated temperatures encountered in deep drilling presently done.

There is a general need for a composition which is capable of imparting and water loss controlling properties to aqueous compositions while being stable to varying conditions and elevated temperatures commonly encountered in deep drilling operations.

SUMMARY OF THE INVENTION

The present invention is directed to a high temperature stable composition capable of imparting a high degree of pseudoplasticity and fluid loss control to alkaline aqueous systems. The composition is a combination of:
 (a) a solid, particulate silicate or alumino-silicate material;
 (b) a chemical compound capable of converting to a higher oxidation state under alkaline conditions; and
 (c) a reaction product formed between a polymeric material selected from polyvinyl alcohol or hydroxyalkyl cellulose and a cross-linking agent, the cross-linking agent present at a concentration equivalent to at least about 1 percent of the hydroxyl groups present in the polymer reactant.

The subject combination imparts fluid loss controlling properties to an aqueous system which are unattributable to each of the separate components and is stable to elevated temperature and conditions commonly encountered in bore hole drilling operations.

DETAILED DESCRIPTION OF THE INVENTION

The present invention is directed to a composition which is capable of exhibiting stability under high temperature conditions, such as above about 250° F. while imparting a high degree of pseudoplastic and fluid (commonly, water) loss controlling properties to aqueous systems; to the use of such compositions to form an improved water-based drilling fluid; and to drilling of bore holes into subterranean formations using said improved drilling fluid.

The subject composition is a combination of a silicate or alumino-silicate material, a polymeric reaction product and a compound capable of converting to a higher oxidation state. The subject composition shall be described in terms of its use as a component of a drilling fluid.

It has been presently found that silicate or alumino-silicate solid, particulate material can be used to impart a high degree of fluid loss properties to aqueous systems when combined with the polyvinyl alcohol reaction product described herein. It is preferred that the solid, particulate material be substantially inorganic and contain a major amount of kaolinite, halloysite, montmorillonite or illite minerals or mixtures thereof and the like. The preferred materials are attapulgite, sepiolite and bentonite.

Bentonite clays are readily available from various sources throughout the world. The material is conventionally mined either from open pits or underground deposits. It is dried from its natural moisture content of 30 to 40 percent to a moisture content of from about 5 to 15 percent. The dried material is customarily pulverized, usually by a roller mill, to a fineness of 200 mesh (90%) or smaller. Bentonite can contain various exchangeable cations within its structure. The major cation can be sodium, potassium, calcium, magnesium or ammonium.

Attapulgite clays are widely used in the drilling industry to impart viscosity to drilling fluids having high electrolyte content. Attapulgite clays are extensively mined in the Georgia-Florida area of the United States. These clays do not exhibit fluid loss control properties.

Other silicate or alumino-silicate materials can be used as the solid, particulate component. These materials can be formed from a variety of natural or artificial sources. They may be in the form of mineral bearing materials of kaolinite, halloysite, montmorillonite of illite or mixtures thereof.

The solid, particulate material found useful in the subject composition should be particulate material such that at least about 90 percent by weight is capable of passing through a No. 20 U.S. Standard Sieve. It is preferred that the major portion of the material be smaller than No. 20 and larger than No. 325 mesh U.S. Standard Sieve Size. The term "solid" as used in the subject application and claims defines a material which is substantially insoluble in the fluid medium such as aqueous based drilling fluids. Material of the same or similar composition can also be present which are of smaller and/or larger particle size.

The polymeric component of the subject composition is formed by contacting a polymeric material selected from a polyvinyl alcohol or a hydroxyalkyl cellulose, as fully described herein below, with a crosslinking agent selected from an aldehyde containing or generating agent or an epihalohydrin.

The polyvinyl alcohol reaction product found useful in forming the subject inventive composition is formed by contacting polyvinyl alcohol and an aldehyde containing or generating compound. The polyvinyl alcohols found useful in forming the subject reaction product have a weight average molecular weight of at least about 20,000 and preferably the weight average molecular weight should be from about 90,000 to 200,000. Conventionally polyvinyl alcohol is the hydrolyzed product of polyvinyl acetate. The hydrolysis should be at least about 75 percent complete and preferably from about 80 to 95 percent complete to form a suitable polyvinyl alcohol reactant. The polyvinyl alcohol reactant, such as formed from the hydrolysis of polyvinyl acetate or the like, can be reacted in an aqueous medium with an aldehyde containing or generating reactant. Suitable aldehyde containing reactants include, for example, formaldehyde, acetaldehyde, propionaldehyde, glycolaldehyde, glyoxylic acid and the like or polyaldehydes such as glyoxal, glutaraldehyde, paraformaldehyde and the like. Other suitable aldehyde reactants include aldehyde generating agents such as malemine-formaldehyde monomeric products and derivatives such as tri and hexa(methylol) melamine and the tri and hexa ($C_1$-$C_3$ alkoxymethyl) melamine. Such materials can be formed by known conventional methods. The alkyl blocked derivatives are commercially available, are stable to self polymerization and are, therefore, preferred. Of all of the aldehyde reactants, the preferred reactants are paraformaldehyde and formaldehyde.

The cross-linking agent found suitable in forming the subject cross-linked polyvinyl alcohol component can also be an epihalohydrin. The halo group can be chlorine, bromine and the like with chlorine being preferred. Further, the epihalohydrin can be substituted with a $C_1$-$C_3$ alkyl group such as methyl, ethyl, or propyl. The most preferred epihalohydrin cross-linking agent is epichlorohydrin due to its availability and superior product formed.

The subject polyvinyl alcohol reaction product found suitable in the subject composition to impart the combined desired properties can be formed by reacting a polyvinyl alcohol, as described above, with from at least about 1 and preferably from about 1 to 200 and most preferably 2 to 50 percent of stoichiometry of at least one of the above described cross-linking reactants based on the hydroxyl contant of the polyvinyl alcohol. We define stoichiometry as the reaction of 2 OH groups with one aldehyde or epi group. Excess cross-linking reactant can be used. The particular quantity of reactant will depend upon the solubility of the reactant in the aqueous reaction media, its reactivity and the like properties as is conventional to those skilled in this art. The reaction product should be dispersible in water. The reaction to form the polyvinyl alcohol aldehyde reaction product can be carried out in an aqueous medium which should be acidic, that is, have a pH of 5.5 or less and preferably from 1 to 4.5 and which may contain other components, such as alkali metal sulfates in from 1% to saturation, to aid in the formation of the polymer product. The reaction can be carried out at ambient or elevated temperatures, such as from about 50° C. to 100° C. The solid product can be recovered by conventional techniques such as by salting out the product using suitable salts as, for example, sulfate, carbonate or phosphate salts, decantation, filtration and drying.

The hydroxyalkyl cellulose reaction product found useful in forming the subject inventive composition is formed by contacting a hydroxyalkyl cellulose with a cross-linking agent as described below. The hydroxyalkyl cellulose can have a $C_1$-$C_3$ alkyl group and, therefore, be hydroxymethyl, hydroxyethyl, hydroxy-n-propyl or hydroxyisopropyl cellulose. These materials are commercially available. The preferred material is hydroxyethyl cellulose. It is well known that unmodified cellulose chains are composed of repeating anhydroglucose rings, each of which has three hydroxy groups. To form hydroxyethyl cellulose, for example, the cellulose is conventionally treated with an alkali hydroxide and then reacted with ethylene oxide by known manners. The hydroxyalkyl cellulose can have a weight average molecular weight of at least about 20,000 and preferably at least 60,000 with from 60,000 to 150,000 being most preferred.

The cross-linked hydroxyalkyl cellulose suitable in the present invention can be formed by reacting hydroxyalkyl cellulose with a cross-linking agent selected from an aldehyde or aldehyde generating agent or an epihalohydrin. Suitable aldehyde containing reactants or aldehyde generating agents are those agents described herein above as reactants with polyvinyl alcohol.

The subject cross-linked hydroxyalkyl cellulose can be formed by reacting a hydroxyalkyl cellulose, as described above, with from at least about 1 and preferably from about 1 to 200 and most preferably 2 to 50 percent of stoichiometry of a cross-linking reactant. Stoichiometry is based on all three available hydroxyl groups of the anhydroglucose rings forming the hydroxyalkyl cellulose.

The formation of the cross-linked hydroxyalkyl cellulose with an aldehyde is carried out in an aqueous acidic medium which has a pH of 5.5 or less and preferably from 1 to 4.5. The reaction can be carried out at ambient or elevated temperatures, such as from about 50° C. to 100° C. The solid product can be recovered by conventional techniques of precipitation by salts or alcohol, filtration and drying.

The formation of the cross-linked hydroxyalkyl cellulose and the cross-linked polyvinyl alcohol with an epihalohydrin should be carried out in a basic aqueous medium which has a pH of at least about 9.5. The reaction can be carried out at ambient or elevated temperatures, such as from about 50° C. to 100° C. The product is recovered by conventional techniques of precipitation by salts of alcohol, filtration and drying.

The present invention further requires the use of a compound capable of converting from a lower to a higher oxidation state. The ability of the compound to make such a conversion is not meant to limit the invention to the requirement that the subject compound undergoes such conversion or that the agent, per se, is merely the precursor for the product required in the subject composition. The compound can be organic or inorganic and of monomeric, low molecular weight. Organic compounds which are suitable include alkanols, preferably lower alkanols, as, for example, methanol, ethanol, n-propanol, iso-propanol, butanols and pentanols and the like; phenols such as phenol, $C_1$–$C_3$ alkyl, aryl and alkaryl substituted phenols, tert-butyl catechol and hydroquinone and the like; mercaptans such as $C_1$–$C_{15}$ alkanethiols and the like. In addition the agent can be an inorganic readily oxidizable substance such as an alkali metal or alkaline earth metal or ammonium salt of a sulfite, bisulfite, thiosulfate, hydrosulfite or nitrite; ferrous or cuprous metal salts of chloride, sulfate and alkali metal borohydrides and the like and their equivalence. The preferred materials are water soluble $C_1$–$C_5$ alkanols, sulfite salts, bisulfite salts and nitrite salts of an alkali or alkaline earth metal or ammonium.

The components of the subject composition should be present in effective amounts such that, in combination, they are capable of exhibiting a high degree of fluid loss controlling properties. Normally these properties are attained by using the above described solid, particulate material and polymeric reaction product in amounts such that their weight ratio is at least 0.75 to 1 with ratio of from 0.75:1 to 3:1 being preferred and 1:1 to 3:1 being most preferred. The chemical compound capable of converting to a higher oxidation state described herein above should be used in amounts such that the ratio of the chemical compound to polymeric reaction product is at least 0.2:1 with, preferably, a ratio of 0.2:1 to 1:1 and most preferably a ratio of at least 0.25:1 to 0.75:1.

Compositions having the combination of the above described components have unexpectedly been found to exhibit the desired fluid-loss control which are unattainable by separate use of the materials. Further, the composition is capable of exhibiting said property under elevated temperatures found in deep bore hole drilling such as greater than 250° F. (121° C.) and generally are stable at temperatures of 300° F. (149° C.) and greater.

The various solid particulate materials including argillaceous materials, such as magnesium or calcium bentonite, impart substantially no fluid loss properties to aqueous systems. Even sodium bentonite is known to be capable of imparting only a low degree of control when used in large dosages.

The presently described polymeric reaction products do not, when used alone, exhibit and impart fluid loss control as described herein above to aqueous systems such as water-based clay-free drilling fluids.

It has been unexpectedly found that the desired properties of fluid loss control and high temperature stability can be attained by using the combination of the three components described above.

The aqueous system which contains the subject composition should have an alkaline pH of at least 8 and preferably from 8 to 12 and more preferably of from 8.3 to 10.3. At these alkaline pH conditions, one attains the desired properties. Adjustment of the pH can be done with any water soluble inorganic base or acid such as alkali metal hydroxide, alkaline earth metal hydroxide or a hydrohalic acid, sulfuric acid, nitric acid, sodium bicarbonate, or sodium carbonate.

The aqueous system contains the subject composition in amounts effective to impart fluid control properties thereto. Generally, concentrations of the composition of from about 1 to 15 weight percent and preferably from about 1.5 to 10 weight percent provide the desired results. The concentration most suitable can be readily determined in conventional manners by the mud engineer.

The above-described composition has been unexpectedly found to exhibit a high degree of fluid loss control to aqueous systems. That is to say that the fluid is capable of interacting with the adjacent porosity to inhibit loss of the fluid to the porous environment. The fluid loss of the system can be determined in accordance with the American Petroleum Institute's procedure API No RP-13B. After initial spurt, the desired water loss control normally attained with the subject composition is of less than about 20 ml per 30 minutes.

It has been further unexpectedly found that the subject composition has excellent stability after subjection to elevated temperatures for sustained periods of time, to high shear rates such as are encountered at the site of the drill bit, as well as being stable in the presence of various corrosive elements such as calcium chloride, and sodium chloride which may be entrained in such fluids.

The drilling fluid composition of the subject invention can contain other conventional drilling fluid additives such as weighting agents as, for example, crushed oyster shells, barite and the like; thinner such as ferrochrome lignosulfonate and the like; lost-circulation agents such as ground walnut shells, cotton seed hulls and the like; pH adjusters such as MgO, sodium carbonate, sodium bicarbonate and the like; as well as other conventional additives.

The terms "water-based" or "aqueous-based" which are used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil bearing formation which has been drilled into or, under certain conditions, from purposeful addition.

The present water-based, clay-free drilling fluids containing the subject composition have been found to be stable to elevated temperatures such as greater than 250° F. to about 350° F. encountered in deep wall drilling, the presence of calcium and sodium salts and to the presence of conventional drilling fluid additives.

The subject composition can be used with conventional bore hole drilling equipment in manners known to those skilled in the art to efficiently and effectively drill bore holes into subterranean formations.

The following examples are given for illustrative purposes only, and are not meant to be a limitation on the subject invention except as indicated by the appended claims. All parts and percentages are by weight unless otherwise indicated.

EXAMPLE I

Formation of Cross-Linked Hydroxyethyl Cellulose

A. A 40 percent aqueous solution of glyoxal was added with stirring to a 5 percent solution of a commercially obtained hydroxyethyl cellulose (MS equals 2.5; Brookfield viscosity of a 5 percent aqueous solution equals 150 centipoise) (Natrosol 250L). The weight ratio of glyoxal to hydroxyethyl cellulose was 21 to 100. The pH of the aqueous system was adjusted to 3.5 with 1 N HCl and the system was heated to 60°–70° C. for 30 minutes with stirring. The resultant aqueous suspension of cross-linked hydroxyethyl cellulose was adjusted to pH 9.5 with 10 percent NaOH solution.

B. A cross-linked hydroxyethyl cellulose was made in the same manner as in Part A above, except that paraformaldehyde was used instead of glyoxal. The weight ratio of paraformaldehyde to HEC was 13.5 to 100.

C. A cross-linked hydroxyethyl cellulose was prepared by adding 5.1 parts epichlorohydrin and 4.4 parts sodium hydroxide to 200 parts of a 5 percent aqueous solution of hydroxyethyl cellulose, as described above. The solution was heated to 80° C. and maintained at that temperature for 1 hour under continuous agitation. The material was cooled to form the aqueous suspension of cross-linked hydroxyethyl cellulose.

EXAMPLE II

Formation of Polyvinyl Alcohol/Aldehyde Product 200 parts of a commercially obtained polyvinyl alcohol having weight average molecular weight of 125,000 and 87% hydrolyzed (Gelvatol 20-90) were dispersed in 600 parts of a 16 percent $Na_2SO_4$ aqueous solution. The solution was then adjusted to pH of 3.0 with HCl. The mixture was heated to 50° C. with stirring. 68 parts of paraformaldehyde were added and then the temperature was raised and maintained for 30 minutes at the temperature of 60° C. while maintaining slow stirring. The mixture was cooled and adjusted to pH of 9.5 with NaOH. The resultant product was filtered air dried and then dried at 50° C. under vacuum for 16 hours.

EXAMPLE III

For comparative purposes each of the polymeric materials of Examples I and II above as well as samples of solid, particulate silicate or alumino-silicate material were tested for fluid loss properties. Each of the solid particulate materials was past through a set of U.S. Standard Sieves. The materials each had a particle size distribution such that less than 5% of the material remained on the No. 20 Sieve and less than about 25% passed through the No. 325 Sieve.

Samples of each of the materials were formed into aqueous systems having the below indicated amount material in distilled water. The pH of each of the formed aqueous systems was adjusted to 9. The fluid loss control was determined according to API procedure RP 13B at low temperature/pressure (25° C. and 100 psi) or high temperature/pressure (163° C. and 500 psi).

TABLE I

| Material | Wt. % | Temp./Press. | Total Fluid Loss |
|---|---|---|---|
| PVA/Ald. (II A) | 1.5 | Low | >200 ml/30 min. |
| PVA/Ald. (II A) | 1.5 | High | >200 ml/30 min. |
| HEC/Ald. | | | |
| IA | 1.0 | Low | >100 |
| IB | 1.0 | Low | >100 |
| IC | 1.0 | Low | >100 |
| Bentonite (Na) | 2 | Low | 22.5 |
| Bentonite (Na) | 2.85 | High | 45.6 |
| Bentonite (Ca) | 4.8 | Low | 62.0 |
| Attapulgite | 4.0 | Low | >100 |
| Sepiolite | 3.0 | Low | >100 |
| Glen Rose Shale | 2.85 | Low | >100 |

Each of the above samples illustrate that the use of the indicated polymeric reaction products when used alone or solid particulate silicate or alumino-silicate material when used alone impart no or very poor fluid loss control properties even under low temperature/low pressure conditions.

EXAMPLE IV

This example illustrates that aqueous systems containing a composition composed of a silicate or alumina-silicate material, a cross-linked polyvinyl alcohol or hydroxy-alkyl cellulose and a compound capable of converting to a higher oxidation state under alkaline conditions as described herein forms a temperature stable fluid loss controlling agent. The pH of each of the samples is adjusted to 9.5. The fluid loss is determined according to API procedure RP 13B and recorded as corrected fluid loss (CFL in ml/30 min.). (CFL=total fluid loss minus spurt).

The aqueous cross-linked polymers formed according to Example 1A and II above are diluted with water to form aqueous system having 1 percent concentration HEC and 1.5 percent concentration PVA. Several 100 parts samples of these aqueous systems (having 1 part cross-linked HEC or 1.5 parts cross-linked PVA) are formed. To each sample is added a silicate or alumina-silicate solid particulate material as described above in Example III in amounts indicated in Table I herein below and 0.5 part of methanol. The samples are each mixed to obtain a substantially uniform mixture and then tested for fluid loss control according to API procedure RP 13 B at 100 psi and 25° C. The samples are then subjected to elevated temperature of 250° F. (121° C.) and 300° F. (149° C.) with constant agitation while in a sealed vessel. The samples are each cooled to ambient temperatures and retested as before. Each sample exhibits a fluid loss control of less than 20 ml/30 min. and does not exhibit substantial change from samples run prior to subjection to elevated temperatures.

| Polymer (conc., parts) | Solid, Particulate (conc., parts) | | Oxidizable Agent (conc., parts) |
|---|---|---|---|
| PVA (1.5) | Na Bentonite | (2.85) | $CH_3OH$ (0.5) |
| PVA (1.5) | Ca Bentonite | (4.8) | $CH_3OH$ (0.5) |
| PVA (1.5) | Attapulgite | (4.0) | $CH_3OH$ (0.5) |
| PVA (1.5) | Sepiolite | (3.0) | $CH_3OH$ (0.5) |
| PVA (1.5) | Glen Rose Shale | (2.85) | $CH_3OH$ (0.5) |
| HEC IA (1.0) | Na Bentonite | (2.85) | $CH_3OH$ (0.5) |
| HEC IA (1.0) | Ca Bentonite | (4.8) | $CH_3OH$ (0.5) |
| HEC IA (1.0) | Attapulgite | (4.0) | $CH_3OH$ (0.5) |
| HEC IA (1.0) | Sepiolite | (3.0) | $CH_3OH$ (0.5) |
| HEC IA (1.0) | Glen Rose Shale | (2.85) | $CH_3OH$ (0.5) |

EXAMPLE V

Example IV is repeated except that the oxidizable agent used therein, methanol, is replaced with an equal amount of sodium sulfite. The samples are tested as above and show that the samples retain fluid loss control properties (<20 ml/30 min.) after subjection to elevated temperature.

EXAMPLE VI

For comparative purposes Example IV is repeated except that the oxidizable agent used therein is excluded. The samples exhibited good fluid loss control prior to subjection to elevated temperature (149° C.). However, the samples exhibited very poor fluid loss control (>100 ml/30 min.) after subjection to elevated temperature.

While the invention has been described in connection with certain preferred embodiments, it is not intended to limit the invention to the particular forms set forth, but, on the contrary, it is intended to cover such alternatives, modifications and equivalents as defined by the appended claims.

We claim:

1. A composition capable of imparting fluid loss control to aqueous systems comprising a mixture of:
   (a) a substantially water insoluble, solid, particulate silicate or alumino-silicate material which contains a major amount of kaolinite, halloysite, montmorillonite or illite or mixtures thereof, or attapulgite or sepiolite and being of a particle size such that at least about 90 percent by weight is capable of passing through a No. 20 U.S. Standard Sieve; in combination with
   (b) a chemical compound capable of converting to a higher oxidation state under alkaline conditions selected from the group consisting of $C_1$-$C_5$ alkanols, unsubstituted or $C_1$-$C_3$ alkyl, aryl or alkaryl substituted phenols, hydroquinone, tert-butyl catechol catechol, $C_1$-$C_{15}$ alkanethiol, alkali metal, alkaline earth metal or ammonium salt of sulfite, bisulfite and nitrite, ferrous metal salts of chloride and sulfate and cuprous metal salts of chloride and sulfate; in combination with
   (c) a reaction product formed between a polymeric material having a weight average molecular weight of at least about 20,000 selected from the group consisting of polyvinyl alcohol and hydroxy $C_1$-$C_3$ alkyl cellulose and at least from about 1 to 200 percent of stoichiometry of a cross-linking agent selected from the group consisting of a compound containing at least one aldehyde group therein or a compound capable of generating in situ at least one aldehyde or an epihalohydrin; the reaction between said polymeric material and said aldehyde carried out in an aqueous acidic medium having a pH of 5.5 or less and the reaction between said polymer and said epihalohydrin being carried out in an aqueous basic medium having a pH of at least about 9.5;
   wherein the weight ratio of component (a) to (c) is at least from about 0.75:1 to 3:1 and of component (b) to (c) is at least from about 0.2:1 to 1:1.

2. The composition of claim 1 wherein the aldehyde containing or generating agent of (c) is selected from the group consisting of formaldehyde, acetaldehyde, propionaldehyde, glycolaldehyde, glyoxylic acid, glyoxal, glutaraldehyde, paraformaldehyde, trimethylol melamine, hexamethylol melamine, tri($C_1$-$C_3$ alkoxymethyl) melamine or hexa($C_1$-$C_3$ alkoxymethyl) melamine.

3. The composition of claim 1 wherein the mixture is dispersed in an aqueous medium.

4. The composition of claim 1 wherein component (b) is selected from the group consisting of $C_1$ to $C_5$ alkanols, or alkali metal, alkaline earth metal or ammonium salts of sulfite, bisulfite and nitrite or mixtures thereof.

5. The composition of claim 1, wherein the component (c) is formed from polyvinyl alcohol having a weight average molecular weight of from about 90,000 to 200,000 and at least about 75 percent hydrolyzed and the ratio of (a) to (c) is from about 1:1 to 3:1.

6. In a water-based, clay-free drilling fluid suitable for circulating in a bore hole while drilling the bore hole into subterranean formations which includes, water, a weighting agent, a rheology enhancing agent and a fluid-loss controller, said improvement comprises that said rheology enhancing agent and fluid-loss controlling agent are, in combination, the composition of claim 1, 2, 3, 4 or 5 present in said fluid in from about 1 to 15 percent by weight based on the weight of the water present in said fluid and said fluid is maintained at a pH of from about 8 to 11.5.

7. In a process of drilling a bore hole into a subterranean formation using conventional bore hole drilling equipment, the improvement comprising circulating in the bore hole while drilling the drilling fluid of claim 6.

* * * * *